United States Patent [19]

Burdick

[11] Patent Number: 4,883,537
[45] Date of Patent: Nov. 28, 1989

[54] AQUEOUS SUSPENSION OF CARBOXYMETHYLCELLULOSE

[75] Inventor: Charles L. Burdick, Landenberg, Pa.
[73] Assignee: Aqualon Company, Wilmington, Del.
[21] Appl. No.: 290,973
[22] Filed: Dec. 28, 1988
[51] Int. Cl.$^4$ ............................................... C08L 1/08
[52] U.S. Cl. .................................................. 106/194
[58] Field of Search ................................ 106/194, 169

[56] References Cited

U.S. PATENT DOCUMENTS

| | | | |
|---|---|---|---|
| 4,069,062 | 1/1978 | Burge | 106/93 |
| 4,283,229 | 8/1981 | Girg et al. | 106/171 |
| 4,296,235 | 10/1981 | Ziche | 536/85 |
| 4,312,675 | 1/1982 | Pickens et al. | 106/171 |
| 4,325,861 | 4/1982 | Braun et al. | 523/205 |
| 4,364,836 | 12/1982 | Ziche | 252/135 |
| 4,726,912 | 2/1988 | Bishop et al. | 252/309 |
| 4,792,357 | 12/1988 | Bier | 106/194 |

OTHER PUBLICATIONS

Chem. Abst., 63:10,170h, 1965, Park, R. L.
Cellulose Gum, Chemical and Physical Properties, (1984).

Primary Examiner—Theodore Morris
Attorney, Agent, or Firm—Mark D. Kuller

[57] ABSTRACT

An aqueous suspension comprising at least 8%, by weight of the total suspension, of water-soluble carboxymethylcellulose dispersed in an aqueous solution comprising at least 33%, by weight of the total salt and water, of potassium carbonate, a process for preparing the same, and use of the same in a variety of applications, are disclosed.

23 Claims, No Drawings

AQUEOUS SUSPENSION OF CARBOXYMETHYLCELLULOSE

This invention is directed to stable aqueous suspensions of water-soluble carboxymethylcellulose, a process for preparing the same, and use of the same in a variety of applications.

BACKGROUND OF THE INVENTION

Water-soluble carboxymethylcellulose is an anionic polymer useful in many industrial processes and consumer products. It has traditionally been handled in its dry, particular form. Problems associated with dry water-soluble carboxymethylcellulose include undesirable dust generation, poor dispersibility when added to aqueous systems, and undesirably long dissolution times.

The dust associated with dry, particular water-soluble carboxymethylcellulose presents the same conventional handling problems as are encountered with similar particular materials. One major concern is the possibility of dust explosions.

Water-soluble carboxymethylcellulose is hygroscopic and absorbs water from the air, which can cause particle agglomeration. Such agglomerated particles are very difficult, if not impossible, to disperse in an aqueous system.

When added to aqueous systems, water-soluble carboxymethylcellulose tends to agglomerate or form clumps. Agglomeration can be reduced in many cases by adding the polymer to the aqueous system slowly with agitation. Slow dissolution substantially reduces the speed of manufacturing operations.

For the above reasons, plant operators desire a fast, effective and simple way of incorporating water-soluble carboxymethylcellulose into an aqueous system. That is, users of water soluble carboxymethylcellulose desire a stable, concentrated, aqueous water-soluble polymer carboxymethylcellulose suspension that can be used to incorporate water-soluble carboxymethylcellulose in aqueous solutions readily, without formation of agglomerates or clumps, and which may be handled without the problems associated with drypowder water-soluble carboxymethylcellulose polymers.

Girg et al, in U.S. Pat. No. 4,283,229, disclose that a stable suspension can be prepared by adding a nonionic, water-soluble cellulose ether derivative to a solution of 4 to 12% of an electrolyte if alumina is added to the suspension. Suitable electrolytes are described to include metal or ammonium salts of mineral acids or organic acids, especially salts which contain an alkali metal ion, an alkaline earth metal ion, an earth metal ion, or a zinc, copper, iron or manganese ion as the cation, and a sulfate, carbonate, silicate, sulfite, halide, phosphate, nitrate, nitrite, acetate, formate, tartrate, or citrate ion, including their hydrogen satls, as the anion. Examples V1 and V2 show dispersion of 25% by weight methylhydroxyethylcellulose using 28 and 20% by weight potassium carbonate, respectively.

The inventor has studied dispersion of anionic, water-soluble carboxymethylcellulose and discovered that high levels of this polymer can be dispersed in an aqueous system using certain levels of potassium carbonate.

SUMMARY OF THE INVENTION

Accordingly, this invention is an aqueous suspension comprising at least 8%, by weight of the total suspension, of water-soluble carboxymethylcellulose dispersed in an aqueous solution comprising at least 33%, by weight of the total salt and water, of potassium carbonate. This invention is also directed to a process for preparing such a suspension and a process of preparing an aqueous solution of dissolved water-soluble carboxymethylcellulose using such a suspension.

DETAILED DESCRIPTION OF THE INVENTION

This invention is a stable, pourable fluid suspension containing high concentrations of water-soluble carboxymethylcellulose.

"Suspension", "dispersion", "solution" and other terms are often confused. Thus, it should be understood that herein "suspension" and "dispersion" can be used interchangeably to mean a system in which solid particles (water-soluble carboxymethylcellulose) are dispersed in a liquid (water). It should also be understood that "solution" means a homogenous mixture of a solvent (e.g., water) with a soluble (e.g., dissolved potassium carbonate, dissolved water-soluble soluble carboxymethylcellulose, etc.).

The carboxymethylcellulose dispersed according to this invention is anionic and water-soluble, e.g., such that the solution viscosity is on the order of 5,000 or more centipoise in a 5 weight percent aqueous carboxymethylcellulose solution and in larger amounts, e.g., 5–10 weight percent, their aqueous solution viscosities are extremely high or they form a gel. For reasons of this very high viscosity, these polymers cannot normally be pumped or handled (dissolved) in aqueous media when their concentrations exceds 5–10 weight percent.

All anionic water-soluble carboxymethylcellulose salts can be dispersed with this invention. The preferred polymer for use in this invention is sodium carboxymethylcellulose. Typically, the polymers of this invention have a carboxymethyl degree of substitution (number of carboxymethyl groups per anhydroglucose unit) of about 0.4 to about 1.2.

Suspensions according to this invention contain at least 8%, by weight of the total suspension, of the particular water-soluble carboxymethylcellulose. Preferably, the concentration of water-soluble carboxymethylcellulose will be in the range of 8 to 35% and most preferably in the range of 20 to 30%.

The aqueous solution comprises at least 33%, preferably 33 to 60%, and most preferably 40% to 50%, by weight of the total salt and water, of potassium carbonate. The desired concentration of salt in water varies with the carboxymethylcellulose type and quantity.

Preferably one or more suspension stabilizers are added to the dispersions. Exemplary are hydrophilic fumed silica, clays such as attapulgite clay, and water-soluble polymers possessing cationic groups or having very low molecular weight such that they are soluble in the potassium carbonate solution. Suspension stabilizers are generally used in amounts up to about 2%, and are preferably used in an amount of 0.5% to 1%, by weight of the total suspension.

Other additives which can be used include pigments, dispersants, surfactants, glycols and thickening agents. These are generally used in amounts up to 10%, preferably 0.5% to 2%, based on the weight of the total suspension.

The suspensions of this invention can be prepared by dissolving the potassium carbonate in water to form an aqueous salt solution and, then, dispersing the water-soluble carboxymethylcellulose in this solution with agitation. In the case where other additives are employed, these are typically added to the water before the salt.

By "stable" is meant that the dispersed phase (water-soluble carboxymethylcellulose) and aqueous phase do not separate for some minimum time after preparation, or if separation does occur the carboxymethylcellulose may be readily redispersed with a minor amount of agitation. Stability is a function of the type of carboxymethylcellulose used, as well as the concentration of carboxymethylcellulose, salt, etc. The suspensions of this invention are stable as made. They should be stable for at least three hours after preparation, preferably stable for at least one day after preparation, and most preferably stable for at least one month after preparation. The stability of the suspensions of this invention can be further improved by mixing the dispersion in a vacuum, so as to remove entrained air. The prolonged stability of the suspensions of this invention permits their preparation at one location and transportation to another location where they are to be used.

The viscosity of the suspensions of this invention are relatively independent of the molecular weight (or solution viscosity) of the carboxymethylcellulose in suspension. Instead, viscosity is proportional to the quantity of carboxymethylcellulose present. Further, the suspension viscosity is inversely proportioal to the potassium carbonate concentration. Consequently, to suspend larger amounts of carboxymethylcellulose it is necessary to use larger potassium carbonate concentrations.

The water-soluble carboxymethylcellulose suspensions of this invention are useful in virtually all applications where dry water-soluble carboxymethylcelluloses are presently used, the only limitation being that the potassium carbonates may not be desirable in some applications. The applications in which the dispersion of this invention may be used include, e.g., water clarification, mineral processing, food and pharmaceutical thickening, cosmetics thickening, agricultural products thickening, oil field applications, building products (e.g., joint cements), ceramics, latex paints, paper coatings, emulsion polymerization, suspension polymerization, etc. Advantages of using the high concentration water-soluble carboxymethylcellulose suspensions of this invention include the ability to control thickening action of the carboxymethylcellulose (thickening time is reduced substantially), ease of handling and dosage control, avoidance of polymer dusting, etc.

The suspensions may be added to aqueous systems (e.g., aqueous solutions), by simply adding, e.g., pouring, the suspension into the aqueous system. Agitation enhances dissolution. The suspension may also be sprinkled, sprayed, etc., where desired for a specific end use.

The granularity of aqueous systems prepared using the aqueous suspensions of this invention may be reduced by using carboxymethylcellulose having relatively uniform carboxymethyl substitution, e.g., CMC-7M8SXF (Aqualon Company, Wilmington, DE). Here, "granularity" refers to the presence of a number of readily visible undissolved "gel specs" when added to dilution water. These gel specs, when observed, can remain insoluble indefinitely in the dilution medium and are usually very undesirable from a performance standpoint.

This invention is demonstrated in the following examples, which are illustrative and not intended to be limiting, wherein all parts, percentages, etc., are by weight. Distilled water was used in each instance.

EXAMPLE 1

An aqueous potassium carbonate solution was prepared by dissolving potassium carbonate into water. Then, carboxymethylcellulose was added incrementally to 100 g of the solution while recording the systems' viscosity as a function of carboxymethylcellulose addition level with a Stormer Viscometer (after each incremental addition the sample was stirred for 15 minutes prior to measuring its viscosity). Carboxymethylcellulose was added to each sample until the system's viscosity exceeded the maximum value that could be measured with the Stormer Viscometer (corresponding to a viscosity of greater than 140 Krebs Units (KU) at which point these systems were not readily pourable). These results are shown in Table 1.

TABLE 1

| | | AQUEOUS SUSPENSIONS OF CMC | | | | |
|---|---|---|---|---|---|---|
| Sample | $K_2CO_3$ (%)[1] | $CMC^2$ Type | $CMC^3$ Level | $CMC^4$ (%) | System[5] Viscosity | Observations |
| 1A | 33.3% solution | CMC-7LF | 3.0 g | 2.9% | below scale | stable suspension >15 mins. |
| 1B | " | " | 9.0 g | 8.3% | " | " |
| 1C | " | " | 12.5 g | 11.1% | 120 KU | " |
| 1D | " | " | 14.0 g | 12.3% | >140 KU | " |
| 2A | " | CMC-7MXF | 9.0 g | 8.3% | 68 KU | " |
| 2B | " | " | 12.0 g | 10.7% | 125 KU | " |
| 2C | " | " | 13.5 g | 11.9% | >140 KU | " |
| 3A | " | CMC-7HXF | 7.5 g | 7.0% | 88 KU | " |
| 3B | " | " | 9.0 g | 8.3% | 135 KU | |
| 3C | " | " | 9.5 g | 8.7% | >140 KU | |
| 4A | " | CMC-7M8SXF | 10.0 g | 9.1% | 106 KU | " |
| 4B | " | " | 11.5 g | 10.3% | 134 KU | " |
| 4C | " | " | 13.0 g | 11.5% | >140 KU | " |
| 5A | 40% | CMC-7LF | 13.0 g | 11.5% | below scale | stable suspension >15 mins. |
| 5B | " | " | 18.0 g | 15.3% | 80 KU | " |
| 5C | " | " | 21.0 g | 17.4% | 129 KU | " |
| 5D | " | " | 22.5 g | 18.4% | >140 KU | " |
| 6A | " | CMC-7MXF | 18.0 g | 15.3% | 72 KU | " |
| 6B | " | " | 19.5 g | 16.3% | 95 KU | " |
| 6C | " | " | 21.0 g | 17.4% | 116 KU | " |
| 6D | " | " | 23.0 g | 18.7% | >140 KU | " |
| 7A | " | CMC-7HXF | 18.0 g | 15.3% | 103 KU | " |

TABLE 1-continued

| | | AQUEOUS SUSPENSIONS OF CMC | | | | |
|---|---|---|---|---|---|---|
| Sample | $K_2CO_3$ (%)[1] | $CMC^{[2]}$ Type | $CMC^{[3]}$ Level | $CMC^{[4]}$ (%) | System[5] Viscosity | Observations |
| 7B | " | " | 19.0 g | 16.0% | 138 KU | " |
| 7C | " | " | 19.5 g | 16.3% | >140 KU | " |
| 8A | " | CMC-7M8SXF | 18.0 g | 15.3% | 68 KU | " |
| 8B | " | " | 19.5 g | 16.3% | 89 KU | " |
| 8C | " | " | 21.0 g | 17.4% | 123 KU | " |
| 8D | " | " | 23.0 g | 18.7% | >140 KU | " |
| 9A | 50% | CMC-7LF | 20.0 g | 16.7% | below scale | stable suspension >15 mins. |
| 9B | " | " | 30.0 g | 23.1% | 82 KU | " |
| 9C | " | " | 35.0 g | 25.9% | 122 KU | " |
| 9D | " | " | 37.0 g | 27.0% | >140 KU | " |
| 10A | " | CMC-7MXF | 30.0 g | 23.1% | 78 KU | " |
| 10B | " | " | 35.0 g | 25.9% | 122 KU | " |
| 10C | " | " | 37.0 g | 27.0% | >140 KU | " |
| 11A | " | CMC-7HXF | 30.0 g | 23.1% | 74 KU | " |
| 11B | " | " | 35.0 g | 25.9% | 116 KU | " |
| 11C | " | " | 37.0 g | 27.0% | >140 KU | " |
| 12A | " | CMC-7M8SXF | 30.0 g | 23.1% | 78 KU | " |
| 12B | " | " | 35.0 g | 25.9% | 134 KU | " |
| 12C | " | " | 37.0 g | 27.0% | >140 KU | " |
| 13A | 54% | CMC-7LF | 25.0 g | 20.0% | 55 KU | stable suspension >15 mins. |
| 13B | " | " | 30.0 g | 23.1% | 70 KU | " |
| 13C | " | " | 37.0 g | 27.0% | 108 KU | " |
| 13D | " | " | 42.0 g | 29.6% | >140 KU | " |
| 14A | " | CMC-7MXF | 30.0 g | 23.1% | 65 KU | " |
| 14B | " | " | 37.0 g | 27.0% | 105 KU | " |
| 14C | " | " | 42.0 g | 29.6% | >140 KU | " |
| 15A | " | CMC-7HXF | 30.0 g | 23.1% | 68 KU | " |
| 15B | " | " | 37.0 g | 27.0% | 100 KU | " |
| 15C | " | " | 42.0 g | 29.6% | 140 KU | " |
| 15D | " | " | 42.5 g | 29.8% | >140 KU | " |
| 16A | " | CMC-7M8SXF | 30.0 g | 23.1% | 68 KU | " |
| 16B | " | " | 37.0 g | 27.0% | 106 KU | " |
| 16C | " | " | 42.0 g | 29.6% | >140 KU | " |

[1] Percentage of potassium carbonated dissolved in water, by total weight of the potassium carbonate and water.
[2] The carboxymethylcellulose (CMC) used is available from the Aqualon Company, Wilmington, DE. The types are indicated by their grade designations. Those with the designation 7LF have a relatively low viscosity, with the designation 7M have a relatively medium viscosity and with the designation 7H have a relatively high viscosity.
[3] Cumulative CMC added to 100 grams potassium carbonate solution.
[4] Percentage of CMC, based on the total weight of the suspension.
[5] Measured on a Stormer Paint Viscometer, Krebs Units (KU).

The above evidence shows that stable carboxymethylcellulose suspensions can be prepared using potassium carbonate per this invention. When various CMC types were added to these salt solutions the CMC did not dissolve, but instead formed fluid pourable suspension that did not exhibit any significant perceptible particle setting after 15 minutes.

The evidence shows that suspension comprising relatively high concentrations of carboxymethylcellulose that do not have excessive viscosity can be prepared. Suspension viscosities were relatively independent of the molecular weights of carboxymethylcellulose suspended. Instead, viscosities were proportional to the potassium carbonate concentration indicating that the maximum quantity of carboxymethylcellulose that can be suspended in a pourable fluid is dependent upon the potassium carbonate concentration. Thus, in order to prepare fluid suspensions having higher carboxymethylcellulose concentrations larger percentages of potassium carbonate were ncessary.

EXAMPLE 2

For comparative purposes a 28% aqueous solution of potassium carbonate, as defined in U.S. patent 4,283,229, example V1 was tested as a possible suspending medium for carboxymethylcellulose. The procedures of Example 1 were repeated using 28% potassium carbonate solutions. The results are shown in Table 2.

TABLE 2

| | ADDITION OF CMC TO 28% POTASSIUM CARBONATE SOLUTION | | | | |
|---|---|---|---|---|---|
| Sample | $K_2CO_3$ (%)[1] | $CMC^{[2]}$ Type | $CMC^{[3]}$ Level | System[4] Viscosity | Observations |
| 17A | 28 | CMC-7LF | 3 g | below scale | CMC dissolves |
| 17B | " | " | 6 g | 85 KU | " |
| 17C | " | " | 9 g | >140 KU | " |
| 18A | " | CMC-7MXF | 3 g | below scale | " |
| 18B | " | " | 6 g | 114 KU | " |
| 18C | " | " | 9 g | >140 KU | " |
| 19A | " | CMC-7HXF | 3 g | 55 KU | " |
| 19B | " | " | 6 g | >140 KU | " |
| 19A | " | CMC-7M8SXF | 3 g | 58 KU | " |

TABLE 2-continued

ADDITION OF CMC TO 28% POTASSIUM CARBONATE SOLUTION

| Sample | $K_2CO_3$ (%)[1] | CMC[2] Type | CMC[3] Level | System[4] Viscosity | Observations |
|---|---|---|---|---|---|
| 19B | " | " | 6 g | >140 KU | " |

[1]Percentage of potassium carbonated dissolved in water, by total weight of the potassium carbonate and water.
[2]The carboxymethylcellulose (CMC) used is available from the Aqualon Company, Wilmington, DE. The types are indicated by their grade designations. Those with the designation 7LF have a low viscosity, with the designation 7M have a medium viscosity and with the designation 7H have a high viscosity.
[3]Cumulative CMC added to 100 grams potassium carbonate solution.
[4]Measured on A Stormer Paint Viscometer, Krebs Units (KU).

The potassium carbonate solutions prepared according to example V1 of U.S. Pat. No. 4,283,229, were ineffective for preparing a suspension with any of the carboxymethylcellulose samples tested. In all instances the carboxymethylcellulose was observed to dissolve and form very viscous carboxymethylcellulose solutions, rather than suspensions. The fact that the carboxymethylcellulose was dissolved was quantitatively evidenced by the sharply higher system viscosities encountered with higher molecular weight carboxymethylcellulose types, such as CMC-7MXF and CMC-7HXF, in the examples of Table 2.

EXAMPLE 3

Solutions were prepared by adding 5 g of suspensions prepared according to the process of Example 1 to 95 g dilution water. The suspensions and polymers used, and results are shown in Table 3.

TABLE 3

SOLUTIONS PREPARED FROM CMC SUSPENSIONS

| Sample | CMC Type | Suspension of Sample No. | Solution[1] Viscosity | Granularity |
|---|---|---|---|---|
| 20 | CMC-7LF | 9D | 34 cps[2] | observed |
| 21 | CMC-7MXF | 10C | 350 cps[3] | observed |
| 22 | CMC-7HXF | 11C | 1100 cps[4] | observed |
| 23 | CMC-7M8SXF | 12C | 415 cps[3] | not apparent |

[1]Brookfield LVT viscosity (30 rpm.)
[2]#1 spindle.
[3]#2 spindle.
[4]#3 spindle.

It was observed that the suspensions of this invention dispersed and then thickened the water rapidly to form viscous solutions.

Best results were obtained with sample 4, which was a carboxymethylcellulose having relatively uniform carboxymethyl substitution.

While the invention has been described with respect to specific embodiments, it should be understood that they are not intended to be limiting and that many variations and modifications are possible without departing from the scope of this invention.

I claim:

1. An aqueous suspension consisting essentially of at least 8%, by weight of the total suspension, of water-soluble carboxymethylcellulose dispersed in an aqueous solution of at least 33%, by weight of the total salt and water, of potassium carbonate.

2. The aqueous suspension of claim 1, wherein the aqueous suspension contains 8% to 35%, based upon the weight of the total aqueous suspensions, of the carboxymethylcellulose.

3. The aqueous suspension of claim 1, wherein the aqueous suspension contains 20% to 30%, based upon the weight of the total aqueous suspension, of the water-soluble carboxymethylcellulose.

4. The aqueous suspension of claim 1, wherein the aqueous solution contains 33% to 60%, by weight of the total salt and water, of the potassium carbonate.

5. The aqueous suspension of claim 1, wherein the aqueous solution contains 40% to 50%, by weight of the total salt and water, of the potassium carbonate.

6. The aqueous suspension of claim 1, wherein the water-soluble carboxymethylcellulose is sodium carboxymentylcellulose.

7. The aqueous suspension of claim 1, further containing up to 2%, based upon the weight of the total aqueous suspension, of a suspension stabilizer.

8. The aqueous suspension of claim 1, further containing up to 2%, based upon the weight of the total aqueous suspension, of a suspension stabilizer selected from the group consisting of fumed silica, clays, water-soluble polymers having cationic groups and water-soluble polymers having very low molecular weight which are soluble in the potassium carbonate solution.

9. The aqueous suspension of claim 1, having had entrained air removed by vacuum.

10. The aqueous suspension of claim 1, which is stable for at lesat three hours after preparation.

11. The aqueous suspension of claim 1, which is stable for at least one day after preparation.

12. The aqueous suspension of claim 1, which is stable for at least one month after preparation.

13. The aqueous suspension of claim 2, wherein the aqueous solution contains 33% to 60%, by weight of the total salt and water, of the potassium carbonate.

14. The aqueous suspension of claim 13, wherein the aqueous suspension contains 20% to 30%, based upon the weight of the total aqueous suspension, of the water-soluble carboxymethylcellulose.

15. The aqueous suspension of claim 14, wherein the aqueous solution contains 40% to 50%, by weight of the total salt and water, of the potassium carbonate.

16. The aqueous suspension of claim 13, further containing up to 2%, based upon the weight of the total aqueous suspension, of a suspension stabilizer.

17. The aqueous suspension of claim 13, wherein the water-soluble carboxymethylcellulose is sodium carboxymethylcellulose.

18. The aqueous suspension of claim 17, having had entrained air removed by vacuum.

19. A process of preparing an aqueous suspension, consisting essentially of dissolving in water at least 33%, by weight of the total salt and water, of potassium carbonate and, then, dispersing therein at least 8%, based on the weight of the total resultant aqueous suspension, of water-soluble carboxymethylcellulose.

20. A process of preparing an aqueous solution of dissolved water-soluble carboxymethylcellulose, comprising adding the aqueous suspension of claim 1 into an aqueous system in a manner such that the water-soluble carboxymethylcellulose dissolves.

21. The aqueous suspension of claim 1, wherein the carboxymethylcellulose has a solution viscosity in a 5 weight percent aqueous carboxymethylcellulose solution of 5,000 or more centipoise.

22. The process of claim 19, further containing removing entrained air by vacuum.

23. The process of claim 19, wherein up to 2%, based upon the weight of the total aqueous suspension, of suspension stabilizer is dissolved in the suspension.

* * * * *

UNITED STATES PATENT AND TRADEMARK OFFICE
CERTIFICATE OF CORRECTION

PATENT NO. : 4,883,537
DATED : NOVEMBER 28, 1989
INVENTOR(S) : C. L. BURDICK

It is certified that error appears in the above-identified patent and that said Letters Patent is hereby corrected as shown below:

Column 1, line 47;
    "drypowder"  should read  -- dry powder --

Column 3, line 34;
    "proportioal"  should read  -- proportional --

Column 10, lines 3-4;

"The process of Claim 19, further containing removing entrained air by vacuum."
                should read -- The process of Claim 19, wherein entrained air is removed by vacuum. --

Signed and Sealed this

Thirtieth Day of April, 1991

Attest:

HARRY F. MANBECK, JR.

*Attesting Officer*        *Commissioner of Patents and Trademarks*